United States Patent
Li et al.

(10) Patent No.: US 11,146,374 B2
(45) Date of Patent: Oct. 12, 2021

(54) TRANSMISSION METHOD AND TRANSMISSION APPARATUS

(71) Applicant: HUAWEI TECHNOLOGIES CO., LTD., Guangdong (CN)

(72) Inventors: Chao Li, Beijing (CN); Qian Zhang, Beijing (CN); Changguo Jiang, Beijing (CN); Jingxin Wei, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/818,885

(22) Filed: Mar. 13, 2020

(65) Prior Publication Data

US 2020/0213060 A1    Jul. 2, 2020

Related U.S. Application Data

(63) Continuation of application No. PCT/CN2018/105400, filed on Sep. 13, 2018.

(30) Foreign Application Priority Data

Sep. 15, 2017   (CN) .......................... 201710854113.1

(51) Int. Cl.
*H04L 5/00* (2006.01)
*H04L 27/00* (2006.01)
*H04L 27/26* (2006.01)

(52) U.S. Cl.
CPC ........ *H04L 5/0053* (2013.01); *H04L 27/0014* (2013.01); *H04L 27/2613* (2013.01); *H04L 27/2628* (2013.01); *H04L 27/2657* (2013.01)

(58) Field of Classification Search
CPC .............. H04L 5/0053; H04L 27/0014; H04L 27/2613; H04L 27/2628; H04L 27/2657
See application file for complete search history.

(56) References Cited

U.S. PATENT DOCUMENTS

| | | | | |
|---|---|---|---|---|
| 6,404,827 | B1* | 6/2002 | Uesugi | H04L 25/024 375/340 |
| 7,020,226 | B1* | 3/2006 | Kirkland | H04L 5/0048 370/203 |

(Continued)

FOREIGN PATENT DOCUMENTS

| | | |
|---|---|---|
| CN | 1237054 A | 12/1999 |
| CN | 107872868 A | 4/2018 |

(Continued)

OTHER PUBLICATIONS

A. Donarski, T. Lamahewa and J. Sorensen, "Downlink LTE synchronization: A software defined radio approach," 2014 8th International Conference on Signal Processing and Communication Systems (ICSPCS), Gold Coast, QLD, 2014, pp. 1-9, doi: 10.1109/ICSPCS.2014.7021088. (Year: 2014).*

(Continued)

*Primary Examiner* — James M Perez
(74) *Attorney, Agent, or Firm* — Womble Bond Dickinson (US) LLP

(57) ABSTRACT

This application provides a transmission method and a transmission apparatus, so that a receive end can correctly demodulate data. A transmission method may include performing a phase compensation operation of a corresponding frequency value on each of m first signals in k signals, to obtain m second signals, where each of the m first signals is located at a non-center frequency of a current carrier, each first signal is a synchronization signal or data, m and k each are a positive integer, and m≤k. The method may also include performing sending processing on the m second signals.

18 Claims, 8 Drawing Sheets

(56) References Cited

U.S. PATENT DOCUMENTS

| | | | | |
|---|---|---|---|---|
| 7,499,496 | B2* | 3/2009 | Fujii | H04L 27/2621 |
| | | | | 370/208 |
| 7,929,639 | B2* | 4/2011 | Jung | H04L 27/26265 |
| | | | | 375/296 |
| 8,406,323 | B2* | 3/2013 | Huang | H04L 27/265 |
| | | | | 375/260 |
| 8,761,303 | B2* | 6/2014 | Griot | H04L 27/2607 |
| | | | | 375/296 |
| 8,861,657 | B2* | 10/2014 | Nilsson | H04L 27/2672 |
| | | | | 375/343 |
| 9,445,432 | B2* | 9/2016 | Tan | H04W 74/08 |
| 9,473,332 | B2* | 10/2016 | Bajcsy | H04L 25/03343 |
| 9,479,381 | B2* | 10/2016 | Siohan | H04L 27/2698 |
| 9,571,322 | B2* | 2/2017 | Bae | H04L 27/2627 |
| 9,853,851 | B2* | 12/2017 | Simon | H04L 27/265 |
| 9,942,011 | B2* | 4/2018 | Tang | H04L 25/03834 |
| 10,033,566 | B2* | 7/2018 | Simon | H04L 5/0007 |
| 10,069,666 | B2* | 9/2018 | Lin | H04L 27/2607 |
| 10,116,370 | B2* | 10/2018 | Obara | H04B 7/10 |
| 10,306,638 | B2* | 5/2019 | Xue | H04J 11/005 |
| 10,707,915 | B2* | 7/2020 | Liu | H04L 5/0048 |
| 10,778,496 | B2* | 9/2020 | Zhu | H04L 27/2657 |
| 10,819,551 | B2* | 10/2020 | Berggren | H04J 11/0073 |
| 10,841,060 | B2* | 11/2020 | Yi | H04L 5/0048 |
| 10,887,842 | B2* | 1/2021 | Fu | H04W 80/08 |
| 10,938,526 | B2* | 3/2021 | Guo | H04L 27/26025 |
| 2003/0123383 | A1* | 7/2003 | Korobkov | H04L 5/0044 |
| | | | | 370/208 |
| 2007/0242599 | A1* | 10/2007 | Gorday | H04L 25/061 |
| | | | | 370/208 |
| 2008/0212698 | A1* | 9/2008 | Kim | H04B 7/0452 |
| | | | | 375/260 |
| 2009/0220019 | A1* | 9/2009 | Kwon | H04L 27/3483 |
| | | | | 375/261 |
| 2009/0232234 | A1* | 9/2009 | Du | H04B 7/2621 |
| | | | | 375/260 |
| 2010/0008216 | A1* | 1/2010 | Li | H04L 27/2657 |
| | | | | 370/208 |
| 2010/0091896 | A1* | 4/2010 | Lee | H04B 7/12 |
| | | | | 375/260 |
| 2011/0190011 | A1* | 8/2011 | Choi | H04L 5/001 |
| | | | | 455/466 |
| 2011/0235743 | A1* | 9/2011 | Lee | H04J 11/00 |
| | | | | 375/295 |
| 2011/0317647 | A1* | 12/2011 | Cho | H04L 27/2607 |
| | | | | 370/329 |
| 2012/0033647 | A1* | 2/2012 | Moon | H04W 74/006 |
| | | | | 370/336 |
| 2013/0040682 | A1* | 2/2013 | Chang | H04W 76/27 |
| | | | | 455/517 |
| 2015/0195116 | A1* | 7/2015 | Bae | H04L 27/2627 |
| | | | | 375/295 |
| 2016/0269090 | A1* | 9/2016 | Kim | H04B 7/046 |
| 2016/0278031 | A1* | 9/2016 | Sorrentino | H04W 76/15 |
| 2016/0308597 | A1* | 10/2016 | Kim | H04B 7/0617 |
| 2017/0094547 | A1* | 3/2017 | Yum | H04W 56/001 |
| 2017/0245278 | A1* | 8/2017 | Xue | H04L 27/2602 |
| 2018/0098298 | A1* | 4/2018 | Jung | H04L 27/266 |
| 2019/0116073 | A1* | 4/2019 | Onkar | H04L 27/0014 |
| 2019/0132817 | A1* | 5/2019 | Liu | H04B 1/713 |
| 2019/0173521 | A1* | 6/2019 | Liu | H04B 1/713 |
| 2019/0181995 | A1* | 6/2019 | Liu | H04W 72/0446 |
| 2019/0191457 | A1* | 6/2019 | Si | H04W 48/12 |
| 2019/0238219 | A1* | 8/2019 | Liu | H04W 72/1215 |
| 2019/0297629 | A1* | 9/2019 | Lin | H04W 72/005 |
| 2019/0319722 | A1* | 10/2019 | Yu | H04B 17/14 |
| 2019/0349799 | A1* | 11/2019 | Siomina | H04L 1/1887 |
| 2020/0037260 | A1* | 1/2020 | Fu | H04L 27/2646 |
| 2020/0213060 | A1* | 7/2020 | Li | H04L 27/2628 |
| 2020/0229177 | A1* | 7/2020 | Zou | H04L 5/001 |
| 2020/0259693 | A1* | 8/2020 | Baldemair | H04L 5/0048 |
| 2020/0266908 | A1* | 8/2020 | Qian | H04L 27/2613 |
| 2020/0274676 | A1* | 8/2020 | Liu | H04L 5/001 |
| 2020/0287768 | A1* | 9/2020 | Hu | H04L 27/0014 |
| 2020/0322876 | A1* | 10/2020 | Zhang | H04L 1/1819 |
| 2020/0322947 | A1* | 10/2020 | Baldemair | H04B 7/0413 |
| 2020/0328845 | A1* | 10/2020 | Sundberg | H04L 5/0053 |
| 2020/0389883 | A1* | 12/2020 | Faxer | H04L 5/0048 |
| 2021/0007083 | A1* | 1/2021 | Yoon | H04L 27/2626 |
| 2021/0064993 | A1* | 3/2021 | Zheng | G01S 15/8977 |
| 2021/0136697 | A1* | 5/2021 | Fu | H04W 52/325 |
| 2021/0143964 | A1* | 5/2021 | Frenne | H04B 7/08 |

FOREIGN PATENT DOCUMENTS

| | | |
|---|---|---|
| WO | 2017123279 A1 | 7/2017 |
| WO | 2019101371 A1 | 5/2019 |

OTHER PUBLICATIONS

Huawei, HiSilicon, "Discussion on SS block transmission frequency locations", 3GPP TSG-RAN WG4 Meeting # 85 R4-1713223, Reno,USA Nov. 27-Dec. 1, 2017, total 3 pages.

MediaTek et al. Way Forward on bandwidth part in NR, R1-1706745, 3GPP TSG-RAN WG1 #88bis, Spokane, USA, Apr. 3-7, 2017, total 2 pages.

NTT Docomo et al. Way forward on initial access and mobility for wider BW operation, R1-1709505, 3GPP TSG RAN WG1 Meeting #89, Hangzhou, P.R. China May 15-19, 2017. total 5 pages.

3GPP TS 38.211 V1.0.0 (Sep. 2017), 3rd Generation Partnership Project; Technical Specification Group Radio Access Network; NR; Physical channels and modulation(Release 15), Sep. 7, 2017. total 37 pages.

3GPP TS 38.213 V1.0.0 (Sep. 2017), 3rd Generation Partnership Project; Technical Specification Group Radio Access Network; NR; Physical layer procedures for control (Release 15), Sep. 2017. total 16 pages.

3GPP TS 38.331 V0.0.5 (Aug. 2017), 3rd Generation Partnership Project; Technical Specification Group Radio Access Network; NR; Radio Resource Control (RRC); Protocol specification (Release 15), Aug. 2019. total 38 pages.

Huawei et al: "Discussion on SS block transmission frequency locations",3GPP TSG-RAN WG4 Meeting #84bis, R4-1710571,Dubrovnik,Croatia Oct. 9-13, 2017, total 2 pages. XP051357409.

\* cited by examiner

TRANSMISSION METHOD AND TRANSMISSION APPARATUS

CROSS-REFERENCE TO RELATED APPLICATIONS

This application is a continuation of International Application No. PCT/CN2018/105400, filed on Sep. 13, 2018, which claims priority to Chinese Patent Application No. 201710854113.1, filed on Sep. 15, 2017. The disclosures of the aforementioned applications are hereby incorporated by reference in their entireties.

TECHNICAL FIELD

This application relates to the communications field, and more specifically, to a transmission method and a transmission apparatus.

BACKGROUND

In a current fifth generation (5G) standardization process of the third generation partnership project (3GPP), a system is considered to support a larger carrier bandwidth. In terms of a maximum carrier bandwidth of 400 MHz that is supported by the system, on a terminal device side, not all terminal devices can support the 400 MHz bandwidth due to limited costs of various different types of terminal devices. Therefore, different types of terminal devices may need to access different parts of the 400 MHz bandwidth. To support access of terminal devices with relatively narrow bandwidths, a network device needs to set at least one synchronization signal or data at different positions of a 400 MHz wideband carrier, to occupy different bandwidth parts or frequency positions on the carrier, so that the terminal devices with the smaller bandwidths access the system at different frequency domain positions of the 400 MHz bandwidth.

Based on the foregoing idea, in a current technology, the network device separately maps the data (for example, a system message) and the synchronization signal to specific frequency domain positions on a current carrier, performs an N-point inverse fast Fourier transform (IFFT) operation with a relatively large value, then performs up-conversion processing on a signal obtained after the N-point IFFT operation, and finally transmits, by using a radio frequency (RF) and an antenna port, a signal obtained after the up-conversion processing.

However, in the foregoing solution, if the synchronization signal or the data is not at a center frequency of the 400 MHz bandwidth, a frequency deviation is generated for the synchronization signal or the data detected by the terminal device. The frequency deviation introduces an additional phase difference and subcarrier offset to a receiver. However, the terminal device does not know values of the additional phase difference and subcarrier offset. Consequently, the terminal device cannot correctly receive the data.

SUMMARY

This application provides a transmission method and a transmission apparatus, so that a receive end can correctly demodulate data.

According to a first aspect, a transmission method is provided. The method includes: performing a phase compensation operation of a corresponding frequency value on each of m first signals in k signals, to obtain m second signals, where each of the m first signals is located at a non-center frequency of a current carrier, each first signal is a synchronization signal or data, m and k each are a positive integer, and m≤k; and performing sending processing on the m second signals.

According to the method in this embodiment of this application, phase compensation is performed on the synchronization signal or data that is not at a center frequency of the current carrier, so that a phase difference caused because the synchronization signal or data is not at the center frequency of the current carrier can be eliminated as much as possible, and a subcarrier offset caused by the phase difference can be eliminated as much as possible. This can increase a possibility that a receive end demodulates the data. Further, if a system message is located at the center frequency of the current carrier, the receive end can correctly demodulate the data (for example, the system message).

In addition, if the data is the system message, according to the method in this embodiment of this application, phase compensation is performed on the system message that is not at the center frequency of the current carrier, so that the receive end can correctly demodulate the system message, and the receive end can successfully access a system.

In a possible embodiment, the performing sending processing on the m second signals includes:

sending the m second signals; or performing sending preprocessing on the m second signals, and sending preprocessed signals.

In a possible embodiment, before the performing a phase compensation operation of a corresponding frequency value on each of m first signals in k signals, the method further includes:

performing subcarrier mapping on an $i^{th}$ synchronization signal or $i^{th}$ data, to obtain an $i^{th}$ mapped signal, where i traverses integers in [1, m]; and performing Ni-point inverse discrete Fourier transform on the $i^{th}$ mapped signal, to obtain an $i^{th}$ first signal in the m first signals, where Ni is a positive integer.

In a possible embodiment, the performing sending preprocessing on the m second signals includes:

performing inverse discrete Fourier transform on each second signal, to obtain m third signals; or performing inverse discrete Fourier transform on each second signal, and adding a cyclic prefix to each signal obtained after the inverse discrete Fourier transform, to obtain m third signals.

Optionally, the inverse discrete Fourier transform may be implemented through inverse discrete Fourier transform (IDFT) or inverse fast Fourier transform (IFFT).

In a possible embodiment, the performing sending preprocessing on the m second signals further includes:

accumulating the m third signals.

During signal transmission, in this embodiment of this application, up-conversion needs to be performed on an accumulated signal only once. Therefore, implementation complexity of a transmit end can be reduced.

In a possible embodiment, the corresponding frequency value of each of the m first signals is a difference between a center frequency of the first signal and a center frequency of the current carrier; or the corresponding frequency value of each first signal is a difference between a center frequency of the first signal and a center frequency of a data channel in the current carrier.

In a possible embodiment, the synchronization signal is located in a bandwidth part (BWP).

Further, m synchronization signals may be located in a same BWP, or may be located in different BWPs.

In a possible embodiment, at least two of the m first signals have different subcarrier spacings.

In a possible embodiment, the k signals include r pieces of data, any one of the r pieces of data is located at a non-center frequency of the current carrier, each of the m first signals corresponds to at least one of the r pieces of data, all of the m first signals correspond to different pieces of data in the r pieces of data, r≥1, and r is an integer.

In a possible embodiment, the method further includes:
performing a phase compensation operation of a corresponding frequency on each of the r pieces of data, or a signal generated by performing a first operation on each of the r pieces of data.

Therefore, when receiving the data, a receive end can correctly demodulate the data.

In a possible embodiment, the method further includes:
a physical broadcast channel includes first indication information, and the first indication information is used to indicate a difference between a center frequency of each of at least one piece of data corresponding to each of the m first signals and a center frequency of the first signal.

In this way, after obtaining a synchronization signal, for example, a first synchronization signal, a receive end may demodulate, when receiving data, the data based on a difference (denoted as a first difference) between a center frequency of the first synchronization signal and a center frequency of a first piece of data (namely, an example of first data).

In a possible embodiment, a difference between a center frequency of each of at least one system message corresponding to each of the m first signals and a center frequency of the first signal is a specific value.

In a possible embodiment, the specific value is an element in a predefined first set, and the first set includes a plurality of candidate specific values.

In a possible embodiment, a center frequency of the data is the same as a center frequency of a control channel indicating the data.

According to a second aspect, a transmission method is provided, including:
obtaining a synchronization signal and a physical broadcast channel, where the physical broadcast channel includes first indication information, and the first indication information indicates a first difference between a center frequency of the synchronization signal and a center frequency of first data or between a center frequency of the synchronization signal and a center frequency of a current carrier;
receiving the first data; and
demodulating the first data based on the first difference.

According to the method in this embodiment of this application, a receive end can correctly demodulate data by using the first difference between the center frequency of the synchronization signal and the center frequency of the first data, so that system performance can be improved.

In a possible embodiment, before the demodulating the first data based on the first difference, the method further includes:
performing a phase compensation operation on the first data based on the first difference.

In a possible embodiment, the first data is a system message, the system message includes second indication information, and the second indication information is used to indicate a second difference between the center frequency of the synchronization signal or a center frequency of the system message and a center frequency of second data; and the method further includes:
detecting the second data based on the second difference.

In a possible embodiment, the center frequency of the system message is the same as a center frequency of a control channel indicating the system message.

According to a third aspect, a transmission method is provided. The method includes: performing inverse discrete Fourier transform on each of m first signals in k signals, to obtain m second signals, and performing a phase compensation operation of a corresponding frequency value on each of the m second signals, to obtain m third signals, where each of the m first signals is located at a non-center frequency of a current carrier, each first signal is a synchronization signal or data, m and k each are a positive integer, and m≤k; and performing sending processing on the m third signals.

According to the method in this embodiment of this application, phase compensation is performed on the synchronization signal or data that is not at a center frequency of the current carrier, so that a phase difference caused because the synchronization signal or data is not at the center frequency of the current carrier can be eliminated as much as possible, and a subcarrier offset caused by the phase difference can be eliminated as much as possible. This can increase a possibility that a receive end demodulates the data. Further, if a system message is located at the center frequency of the current carrier, the receive end can correctly demodulate the data (for example, the system message).

In addition, if the data is the system message, according to the method in this embodiment of this application, phase compensation is performed on the system message that is not at the center frequency of the current carrier, so that the receive end can correctly demodulate the system message, and the receive end can successfully access a system.

In a possible embodiment, the performing sending processing on the m third signals includes:
sending the m third signals; or
performing sending preprocessing on the m third signals, and sending preprocessed signals.

In a possible embodiment, the performing sending preprocessing on the m third signals includes:
performing inverse discrete Fourier transform on each third signal.

Optionally, the inverse discrete Fourier transform may be implemented through inverse discrete Fourier transform (IDFT) or inverse fast Fourier transform (IFFT).

In a possible embodiment, the performing sending preprocessing on the m third signals further includes:
adding a cyclic prefix to each signal obtained after the inverse discrete Fourier transform, to obtain a fourth signal.

In a possible embodiment, the performing sending preprocessing on the m third signals further includes:
accumulating the m fourth signals.

In a possible embodiment, the corresponding frequency value of each of the m first signals is a difference between a center frequency of the first signal and a center frequency of the current carrier; or the corresponding frequency value of each first signal is a difference between a center frequency of the first signal and a center frequency of a data channel in the current carrier.

In a possible embodiment, the synchronization signal is located in a bandwidth part BWP.

Further, m synchronization signals may be located in a same BWP, or may be located in different BWPs.

In a possible embodiment, at least two of the m first signals have different subcarrier spacings.

In a possible embodiment, the k signals include r pieces of data, any one of the r pieces of data is located at a non-center frequency of the current carrier, each of the m first signals corresponds to at least one of the r pieces of data, all of the m first signals correspond to different pieces of data in the r pieces of data, r≥1, and r is an integer.

In a possible embodiment, the method further includes:
performing a phase compensation operation of a corresponding frequency on each of the r pieces of data, or a signal generated by performing a first operation on each of the r pieces of data.

Therefore, when a transmit end performs no phase compensation (operation) on the synchronization signal, a terminal can correctly demodulate data when receiving the data.

In a possible embodiment, the method further includes:
a physical broadcast channel includes first indication information, and the first indication information is used to indicate a difference between a center frequency of each of at least one piece of data corresponding to each of the m first signals and a center frequency of the first signal.

In this way, after obtaining a synchronization signal, for example, a first synchronization signal, a terminal may demodulate, when receiving data, the data based on a difference (denoted as a first difference) between a center frequency of the first synchronization signal and a center frequency of a first piece of data (namely, an example of first data).

In a possible embodiment, a difference between a center frequency of each of at least one system message corresponding to each of the m first signals and a center frequency of the first signal is a specific value.

In a possible embodiment, the specific value is an element in a predefined first set, and the first set includes a plurality of candidate specific values.

In a possible embodiment, a center frequency of the data is the same as a center frequency of a control channel indicating the data.

According to a fourth aspect, a transmission method is provided, including:
obtaining a synchronization signal and a physical broadcast channel, where the physical broadcast channel includes first indication information, and the first indication information indicates a first difference between a center frequency of the synchronization signal and a center frequency of first data or between a center frequency of the synchronization signal and a center frequency of a current carrier;
receiving the first data; and
demodulating the first data based on the first difference.

According to the method in this embodiment of this application, a receive end can correctly demodulate data by using the first difference between the center frequency of the synchronization signal and the center frequency of the first data, so that system performance can be improved.

In a possible embodiment, before the demodulating the first data based on the first difference, the method further includes:
performing a phase compensation operation on the first data based on the first difference.

In a possible embodiment, the first data is a system message, the system message includes second indication information, and the second indication information is used to indicate a second difference between the center frequency of the synchronization signal or a center frequency of the system message and a center frequency of second data; and the method further includes:
detecting the second data based on the second difference.

In a possible embodiment, the center frequency of the system message is the same as a center frequency of a control channel indicating the system message.

According to a fifth aspect, a transmission apparatus is provided, and is configured to perform the method in any one of the first aspect, the third aspect, the possible embodiments of the first aspect, or the possible embodiments of the third aspect. Specifically, the transmission apparatus includes modules configured to perform the method in any one of the first aspect, the third aspect, the possible embodiments of the first aspect, or the possible embodiments of the third aspect.

According to a sixth aspect, a transmission apparatus is provided, and is configured to perform the method in any one of the second aspect, the fourth aspect, the possible embodiments of the second aspect, or the possible embodiments of the fourth aspect. Specifically, the transmission apparatus includes modules configured to perform the method in any one of the second aspect, the fourth aspect, the possible embodiments of the second aspect, or the possible embodiments of the fourth aspect.

According to a seventh aspect, a transmission apparatus is provided. The transmission apparatus includes a transceiver, a memory, and a processor. The memory is configured to store a computer program. The processor is configured to invoke the computer program from the memory and run the computer program, so that the transmission apparatus is enabled to perform the method in any one of the first aspect, the third aspect, the possible embodiments of the first aspect, or the possible embodiments of the third aspect.

According to an eighth aspect, a transmission apparatus is provided. The transmission apparatus includes a transceiver, a memory, and a processor. The memory is configured to store a computer program. The processor is configured to invoke the computer program from the memory and run the computer program, so that the transmission apparatus is enabled to perform the method in any one of the second aspect, the fourth aspect, the possible embodiments of the second aspect, or the possible embodiments of the fourth aspect.

According to a ninth aspect, a computer-readable storage medium is provided, and is configured to store a computer program. The computer program includes an instruction used to perform the method in the foregoing aspects and any possible embodiment of the foregoing aspects.

According to a tenth aspect, a computer program product including an instruction is provided. When the computer program product is run on a computer, the computer is enabled to perform the method in the foregoing aspects and any possible embodiment of the foregoing aspects.

According to an eleventh aspect, an embodiment of this application provides a baseband chip, including a processor and a memory. The memory is configured to store a program instruction, and the processor executes the instruction, so that the baseband chip is enabled to perform the method in the foregoing aspects and any possible embodiment of the foregoing aspects.

DESCRIPTION OF EMBODIMENTS

Figure 1:
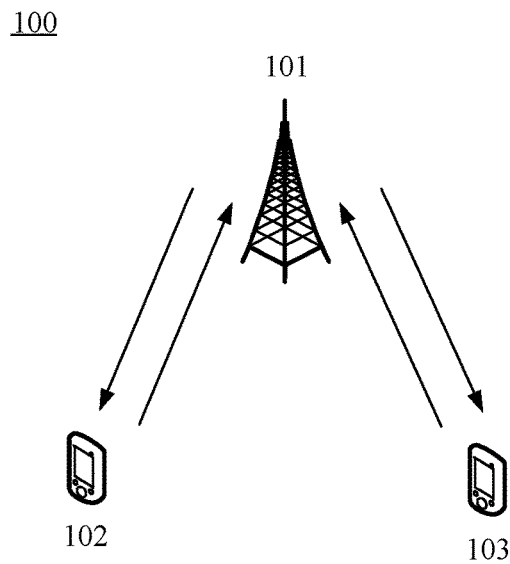
FIG. 1 is a schematic diagram of a system applied to an embodiment of this application.

The following describes technical solutions of this application with reference to accompanying drawings.

It should be understood that division into manners, cases, types, and embodiments in embodiments of this application are merely for ease of description, but should not constitute any special limitation, and features in various manners, types, cases, and embodiments may be combined when there is no contradiction.

It should also be understood that "first", "second", and "third" in the embodiments of this application are merely used for differentiation, and should not constitute any limitation on this application.

It should be understood that sequence numbers of the processes do not mean execution sequences in various embodiments of this application. The execution sequences of the processes should be determined based on functions and internal logic of the processes, and should not be construed as any limitation on the implementation processes of the embodiments of this application.

It should be understood that sequence numbers of the processes do not mean execution sequences in various embodiments of this application. The execution sequences of the processes should be determined based on functions and internal logic of the processes, and should not be construed as any limitation on the implementation processes of the embodiments of this application.

The technical solutions of the embodiments of this application may be applied to various communications systems, such as a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5th generation (5G) system, or a new radio (NR) system.

A terminal device in the embodiments of this application may be referred to as user equipment (UE), an access terminal device, a subscriber unit, a subscriber station, a mobile station, a mobile console, a remote station, a remote terminal device, a mobile device, a user terminal device, a terminal, a wireless communications device, a user agent, a user apparatus, or the like. The terminal device may alternatively be a cellular phone, a cordless phone, a session initiation protocol (SIP) phone, a wireless local loop (WLL) station, a personal digital assistant (PDA), a handheld device having a wireless communications function, a computing device or another processing device connected to a wireless modem, a vehicle-mounted device, a wearable device, a terminal device in a future 5G network, a terminal device in a future evolved public land mobile network (PLMN), or the like. This is not limited in the embodiments of this application.

A network device in the embodiments of this application may be a device configured to communicate with the terminal device. The network device may be a base transceiver station (BTS) in a global system for mobile communications (GSM) or a code division multiple access (CDMA) system, may be a NodeB (NB) in a wideband code division multiple access (WCDMA) system, may be an evolved NodeB (eNB or eNodeB) in an LTE system, or may be a wireless controller in a cloud radio access network (CRAN) scenario. Alternatively, the network device may be a relay node, an access point, a vehicle-mounted device, a wearable device, a network device in a 5G network, a network device in a future evolved PLMN network, or the like. This is not limited in the embodiments of this application.

FIG. 1 is a schematic diagram of a system 100 applicable to an embodiment of this application. As shown in FIG. 1, the system 100 includes a network device 101. The system 100 further includes a terminal device 102 and a terminal device 103 that are located within a coverage area of the network device 101. The network device 101 may communicate with the terminal device 102 and the terminal device 103. It should be understood that, in FIG. 1, only the two terminal devices in the coverage area of the network device 101 are used as an example. It is clear that there may be more terminal devices in the coverage area of the network device 101.

The system shown in FIG. 1 may support a carrier bandwidth greater than 20 MHz. A maximum carrier bandwidth of 400 MHz that is supported by the system is used as an example. Because the terminal device 102 and the terminal device 103 cannot support a 400 MHz bandwidth, the terminal device 102 and the terminal device 103 may need to access different parts of the 400 MHz bandwidth. To support access of the terminal device 102 and the terminal device 103 with relatively narrow bandwidths, the network device 101 needs to set a plurality of synchronization signals or data at different positions of a 400 MHz wideband carrier, to occupy different bandwidth parts or frequency positions on the carrier, so that the terminal device 102 and the terminal device 103 access the system 100 at different frequency domain positions of the 400 MHz bandwidth.

Figure 2:
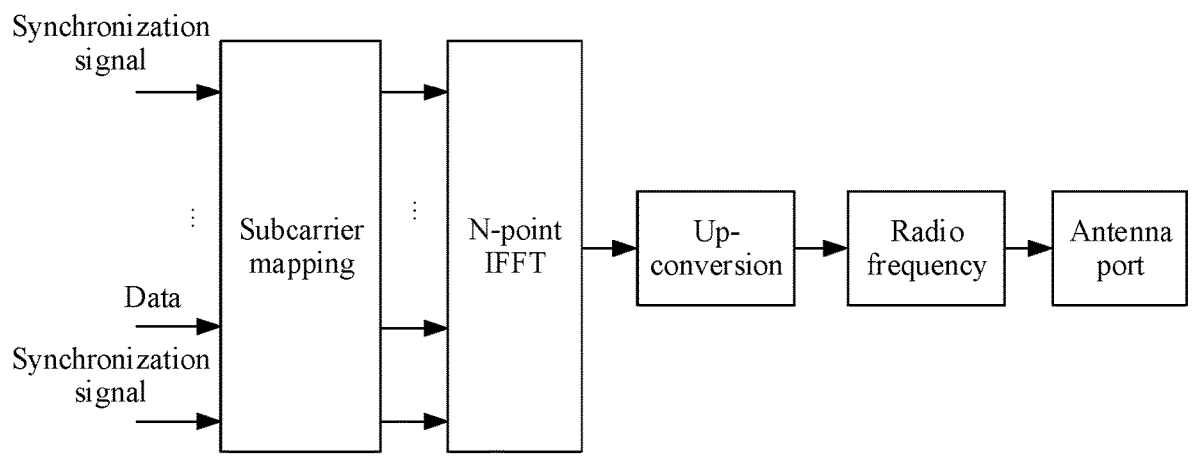
FIG. 2 is a schematic diagram of a transmission method.

Therefore, as shown in FIG. 2, the network device separately performs subcarrier mapping on data (for example, a system message) and a synchronization signal to map the data and the synchronization signal to specific frequency domain positions on a current carrier, performs an N-point IDFT or IFFT operation with a relatively large value, then performs up-conversion processing on a signal obtained after the N-point IDFT or IFFT operation, and finally transmits, by using an RF and an antenna port, a signal obtained after the up-conversion processing.

When a transmitter of the network device transmits the signal in the manner shown in FIG. 2, during initial access, the terminal device scans the synchronization signal or the data step by step based on a predefined frequency raster of the signal.

An expression of consecutive time domain signals sent by the transmitter of the network device is:

$$s(t) = \left(\frac{1}{\sqrt{N}} \sum_{k=0}^{N-1} a(k) e^{j2\pi k \cdot f_{SCS} t}\right) e^{j2\pi f_c t} \quad (1)$$

N indicates a total quantity of subcarriers on a current carrier in a multi-carrier system, k indicates a $k^{th}$ subcarrier, fscs indicates subcarrier spacings of all subcarriers, t indicates time, and $f_C$ indicates a center frequency of transmitting a to-be-transmitted signal. a(k) indicates to-be-transmitted data on the $k^{th}$ subcarrier. The to-be-transmitted data may be a synchronization signal, a broadcast message, or service data (which is briefly referred to as "data" below) of a user.

$$\frac{1}{\sqrt{N}}$$

indicates a normalization operation, and is optional. In other words, the formula (1) may alternatively be represented as:

$$s(t) = \left(\sum_{k=0}^{N-1} a(k) e^{j2\pi k \cdot f_{SCS} t}\right) e^{j2\pi f_c t} \quad (2)$$

In this application, a normalization operation of a corresponding length may or may not be performed on all time domain signals or a signal obtained after IDFT or IFFT. For ease of description, the following provides descriptions by using an example in which the normalization operation is performed.

During receiving, a receiver of the terminal device detects and receives, based on a frequency of the synchronization signal, a transmit signal s(t) that enters the receiver, where $$r_{SSB_i}(t) = s(t) e^{-j2\pi f_{sync} t} \cdot e^{j2\pi f_{err} t} = \left(\frac{1}{\sqrt{N}} \sum_{k=0}^{N-1} a(k) e^{j2\pi k \cdot f_{SCS} t}\right) e^{j2\pi(\Delta f + f_{err}) t} \quad (3)$$

$r_{SSB_i}(t)$ indicates a received signal of an $i^{th}$ synchronization signal, $f_{sync}$ indicates a frequency used when the receiver detects a synchronization signal SSBi, $f_{err}$ indicates an additional frequency deviation introduced when the receiver detects the synchronization signal, and $\Delta f = f_C - f_{sync}$. When the received signal is user data, the expression of the foregoing formula (3) is unchanged, while in this case, a(k) indicates the user data rather than the synchronization signal. The following provides further descriptions by using processing for the synchronization signal as an example.

Similarly, an expression of a signal on which no normalization operation is performed is:

$$r_{SSB_i}(t) = s(t) e^{-j2\pi f_{sync} t} \cdot e^{j2\pi f_{err} t} = \left(\sum_{k=0}^{N-1} a(k) e^{j2\pi k \cdot f_{SCS} t}\right) e^{j2\pi(\Delta f + f_{err}) t} \quad (4)$$

If a sampling rate at which the terminal device detects the synchronization signal is $F_{SS}$, the terminal device performs low-pass filtering on the detected signal, and detects synchronization signals on subcarriers on which M SSBs are located. An expression of a time domain signal is:

$$r_{SSB_i}(n) = \left(\frac{1}{\sqrt{N}} \sum_{k=0}^{M-1} a(k)\right) e^{j2\pi k(\Delta f + f_{err}) \frac{n}{F_{SS}}} = \quad (5)$$

$$\left(\frac{1}{\sqrt{N}} \sum_{k=0}^{M-1} a(k+s)\right) e^{j2\pi \alpha k \frac{n}{M}}, \text{ where}$$

$$s = \lfloor (\Delta f + f_{err})/F_{SS} \rfloor$$

$$\alpha = (\Delta f + f_{err})/F_{SS} - s \cdot F_{SS} \quad (6)$$

A physical meaning of the formula (6) is as follows: In a large bandwidth, for example, in a 400 MHz bandwidth, if a synchronization signal is not at a center frequency of the 400 MHz bandwidth, a frequency deviation is generated for a synchronization signal or data detected by the terminal device, and the frequency deviation introduces an additional phase difference and subcarrier offset to the receiver. However, the terminal device that performs initial access does not know values of the additional phase difference and subcarrier offset. Consequently, the terminal device cannot correctly receive the data.

It should be noted that the foregoing access may alternatively be access of the terminal device in a device-to-device (D2D) scenario. In other words, this application is also applicable to the D2D scenario.

Based on this, this application provides a transmission method. According to the method, phase compensation is performed on a synchronization signal or data that is not at a center frequency of a current carrier, so that a phase difference caused because the synchronization signal or data is not at the center frequency of the current carrier can be eliminated as much as possible, and a subcarrier offset caused by the phase difference can be eliminated as much as possible. This can increase a possibility that a terminal device demodulates the data.

Before the transmission method in the embodiments of this application is described, some concepts or data in this application are first described.

(1) Bandwidth Part (BWP)

In NR, different terminal devices in a same cell may have different transmitting or receiving capabilities. Therefore, a system may configure a corresponding bandwidth for each terminal device. The bandwidth configured for the terminal device is referred to as a BWP, and the terminal device performs transmission in the BWP of the terminal device. For example, the terminal device transmits a sounding reference signal (SRS) in the BWP of the terminal device, so that a network device performs channel estimation and resource scheduling, and the terminal device transmits data in the BWP of the terminal device based on the scheduling of the network device. The system may configure different BWPs for different terminal devices. To support different services, different BWPs may support different transmission bandwidths (in other words, quantities of resource blocks (RB) included in the BWPs are different), different subcarrier spacings, different cyclic prefixes (CP), and the like. The scheduling may be measured by a slot, a mini-slot, or the like.

(2) Synchronization Signal

The synchronization signal in this application may include a primary synchronization signal (PSS) and/or a secondary synchronization signal (SSS).

Optionally, the synchronization signal may be carried in a synchronization signal block (SSB) and sent by using the SSB. However, this is not limited in the embodiments of this application.

For example, one SSB may include a PSS of one orthogonal frequency division multiplexing (OFDM) symbol, an SSS of one OFDM symbol, and physical broadcast channels (PBCH) of two OFDM symbols. A PSS, an SSS, and PBCHs in each SSB occupy four consecutive OFDM symbols.

(3) System Message

The system message may be remaining system information (RMSI) and/or other system information (OSI). However, the embodiments of this application are not limited thereto.

Figure 3:
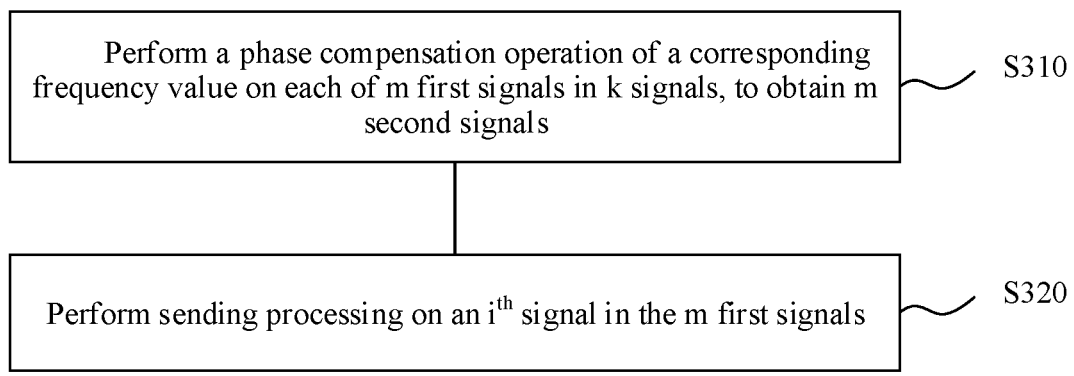
FIG. 3 is a schematic flowchart of a transmission method according to an embodiment of this application.

The following describes in detail the transmission method in the embodiments of this application with reference to FIG. 3.

FIG. 3 is a schematic interaction diagram of an example of a transmission method according to an embodiment of this application. It should be understood that FIG. 3 shows detailed steps or operations of the method 300. However, these steps or operations are merely an example. In this embodiment of this application, another operation may be further performed or only some of the operations in FIG. 3 are performed.

The method 300 may be performed by a transmit end. The transmit end may be a network device or a terminal device. The network device may correspond to the network device 101 in the foregoing communication scenario. The terminal device may correspond to the terminal device 102 or the terminal device 103 in the foregoing communication scenario. If the transmit end is the network device, a receive end may be the terminal device or another network device. If the transmit end is the terminal device, a receive end may be another terminal device. This embodiment of this application is not limited thereto.

As shown in FIG. 3, the method 300 mainly includes S310 and S320. The following describes this embodiment of this application by using an example in which the transmit end is the network device and the receive end is the terminal device.

S310. Perform a phase compensation operation of a corresponding frequency value on each of m first signals in k signals, to obtain m second signals.

An $i^{th}$ first signal in the m first signals is located at a non-center frequency of a current carrier, for example, located in an initial 100 MHz bandwidth in a 400 MHz system bandwidth. The m first signals are in a one-to-one correspondence with the m second signals. In other words, one second signal is generated by performing the phase compensation operation of the corresponding frequency value on each of the m first signals. For example, an $i^{th}$ second signal in the m second signals is generated by performing a phase compensation operation of a corresponding frequency value on the $i^{th}$ first signal in the m first signals. $k \geq 1$, $m \geq 1$, $m \leq k$, k and m each are an integer, and i traverses integers in [1, m].

In the following, for ease of understanding and description, the $i^{th}$ first signal in the m first signals is denoted as $Y_i(k)$ (which is denoted as $Y_i$ below for ease of description), and the $i^{th}$ second signal in the m second signals is denoted as $Z_i(k)$ (which is denoted as $Z_i$ below for ease of description).

The phase compensation operation of the corresponding frequency value is performed on $Y_i$. To be specific, $Y_i$ is multiplied by $e^{j2\pi k \cdot \Delta f_i t}$ or $e^{-j2\pi k \cdot \Delta f_i t}$, to obtain $Z_i$. In other words, $$Z_i = Y_i e^{j2\pi k \cdot \Delta f_i t} \quad (7), \text{ or}$$

$$Z_i = Y_i e^{-j2\pi k \cdot \Delta f_i t} \quad (8)$$

$\Delta f_i$ is the corresponding frequency value of $Y_i$. k indicates k subcarriers.

Optionally, $\Delta f_i$ is a difference between a center frequency of the $i^{th}$ first signal (namely, $Y_i$) and a center frequency of the current carrier. Alternatively, $\Delta f_i$ is a difference between a center frequency of $Y_i$ and a center frequency of a data channel in the current carrier.

It should be understood that, for the frequency compensation operation performed on a signal in this application, refer to the complex multiplication of the frequency value $\Delta f_i$ that is performed on the signal in the expression (7), or refer to the complex multiplication of the frequency value $-\Delta f_i$ that is performed on the signal in the expression (7). This is not limited in this embodiment of this application. For ease of description and understanding, the following uses only the expression (7) for description, but this does not mean that the expression (8) is excluded for frequency compensation.

Optionally, at least two of the m first signals have different subcarrier spacings.

The following describes $Y_i$ in detail.

$Y_i$ may be an $i^{th}$ synchronization signal (in a case 1), or $Y_i$ may be $i^{th}$ data (in a case 2). Alternatively, $Y_i$ may be a signal generated by performing a first operation on an $i^{th}$ synchronization signal (in a case 3), or $Y_i$ may be a signal generated by performing a first operation on $i^{th}$ data (in a case 4).

Without loss of generality, the following describes this embodiment of this application in detail by using an example in which m=2, in other words, i=1 or 2. In addition, for ease of understanding and description, a $1^{st}$ first signal and a $2^{nd}$ first signal are respectively denoted as $X_1$ and $X_2$.

The case 1 is as follows:

$Y_i$ is the $i^{th}$ synchronization signal, $Y_1=X_1$, and $Y_2=X_2$.

In this case, the network device directly performs the phase compensation operation of the corresponding frequency value on $Y_i$, to obtain $Z_i$ shown in the formula (7) or (8).

Optionally, $Y_i$ is a bandwidth part BWP.

Further, at least two of m synchronization signals are located in different bandwidth parts, or m synchronization signals are located in a same bandwidth part.

The case 2 is as follows:

$Y_i$ is the $i^{th}$ data, $Y_1=X_1$, and $Y_2=X_2$.

In this case similar to the case 1, the network device directly performs the phase compensation operation on $Y_i$, to obtain $Z_i$ shown in the formula (7) or (8).

The case 3 is as follows:

$Y_i$ is the signal generated by performing the first operation on the $i^{th}$ synchronization signal.

In this case, the network device first separately performs the first operation on $X_1$ and $X_2$, to obtain $Y_1$ and $Y_2$, and then performs a phase compensation operation of a corresponding frequency value on each of $Y_1$ and $Y_2$.

The following describes the first operation in detail according to several different embodiments of the first operation.

Manner 1

The first operation includes subcarrier mapping and inverse discrete Fourier transform.

Specifically, subcarrier mapping is first separately performed on $X_1$ and $X_2$. To be specific, $X_1$ and $X_2$ are respectively mapped to different physical resources. Then, $N_1$-point inverse discrete Fourier transform is performed on an obtained $1^{st}$ signal, and $N_2$-point inverse discrete Fourier transform is performed on an obtained $2^{nd}$ signal. Finally, a phase compensation operation is performed on each of two signals obtained after inverse discrete Fourier transform.

When the inverse discrete Fourier transform is performed, a value of $N_i$ may be determined based on a subcarrier spacing $f_i$ obtained after the subcarrier mapping is performed on $X_i$.

For example, in a given system bandwidth, when $f_1=15$ KHz, $N_1=4096$, and when $f_2=30$ KHz, $N_2=2048$, or when $f_2=30$ KHz=120 KHz, $N_2=512$.

It should be further understood that if $f_1=f_2$, in other words, if subcarrier spacings of two synchronization signals are equal, $N_1$ may be equal to $N_2$; or if $f_1 \neq f_2$, $N_1$ may not be equal to $N_2$.

Optionally, the inverse discrete Fourier transform in this embodiment of this application may be implemented through IDFT or IFFT. However, this embodiment of this application is not limited thereto.

Manner 2

The first operation includes subcarrier mapping.

In other words, subcarrier mapping is performed on $X_1$ and $X_2$. To be specific, $X_1$ and $X_2$ are respectively mapped to different physical resources. Then, a phase compensation operation is performed on each of two signals obtained after the subcarrier mapping.

Manner 3

The first operation includes inverse discrete Fourier transform.

To be specific, $X_1$ and $X_2$ are respectively mapped to different physical resources.

The case 4 is as follows:

$Y_i$ is the signal generated by performing the first operation on the $i^{th}$ data.

In this case, the network device first separately performs the first operation on $X_1$ and $X_2$, to obtain $Y_1$ and $Y_2$, and then performs a phase compensation operation of a corresponding frequency value on each of $Y_1$ and $Y_2$.

The first operation may be implemented in Manner 1 or Manner 2. For details, refer to the foregoing description. For brevity, details are not described herein again.

S320. Perform sending processing on the $i^{th}$ signal in the m first signals.

For example, the performing sending processing on the $i^{th}$ signal in the m first signals includes:

sending the m second signals; or performing sending preprocessing on the m second signals, and sending preprocessed signals.

Optionally, the performing sending preprocessing on the m second signals includes: performing inverse discrete Fourier transform on each second signal, to obtain m signals (namely, an example of m third signals) obtained after the inverse discrete Fourier transform.

In other words, the m signals obtained after the inverse discrete Fourier transform are the preprocessed signals. Alternatively, other processing such as cyclic prefix addition may be performed on the m signals obtained after the inverse discrete Fourier transform, to obtain the preprocessed signals. Then, the preprocessed signals are sent.

Further, the performing sending preprocessing on the m second signals further includes: accumulating all the signals obtained after the inverse discrete Fourier transform.

In other words, the inverse discrete Fourier transform may be first performed on each second signal, and then all the signals obtained after the inverse discrete Fourier transform are accumulated. An accumulated signal may be used as the preprocessed signal. Alternatively, another operation such as up-conversion is performed on an accumulated signal to obtain the preprocessed signal. Then, the preprocessed signal is sent.

Optionally, the performing sending preprocessing on the m second signals includes: performing inverse discrete Fourier transform on each second signal, and adding a cyclic prefix to each signal obtained after the inverse discrete Fourier transform, to obtain m signals (namely, another example of m third signals) to which cyclic prefixes are added.

In other words, the m signals to which the cyclic prefixes are added are the preprocessed signals. Alternatively, other processing such as up-conversion may be performed on the m signals to which the cyclic prefixes are added, to obtain the preprocessed signals. Then, the preprocessed signals are sent.

Further, the performing sending preprocessing on the m second signals further includes: accumulating the m signals to which the cyclic prefixes are added.

In other words, the inverse discrete Fourier transform may be first performed on each second signal, the cyclic prefix is added to each signal obtained after the inverse discrete Fourier transform, and then the m signals to which the cyclic prefixes are added are accumulated. An accumulated signal may be used as the preprocessed signal. Alternatively, another operation such as up-conversion is performed on an accumulated signal to obtain the preprocessed signal. Then, the preprocessed signal is sent.

For example, corresponding to the case 1 to case 4, sending preprocessing performed on the $i^{th}$ second signal in the m second signals is separately described in detail by using the following (1) to (4).

(1)

The sending preprocessing may include subcarrier mapping and inverse discrete Fourier transform.

Specifically, subcarrier mapping is first separately performed on $Z_1$ and $Z_2$. To be specific, $Z_1$ and $Z_2$ are respectively mapped to different physical resources. Then, $N_1$-point inverse discrete Fourier transform is performed on an obtained $1^{st}$ signal, and $N_2$-point inverse discrete Fourier transform is performed on an obtained $2^{nd}$ signal. Finally, a phase compensation operation is performed on each of two signals obtained after inverse discrete Fourier transform.

When the inverse discrete Fourier transform is performed, a value of $N_i$ may be determined based on a subcarrier spacing $f_i$ obtained after the subcarrier mapping is performed on $Z_i$.

For example, in a given system bandwidth, when $f_1=15$ KHz, $N_1=4096$, and when $f_2=30$ KHz, $N_2=2048$, or when $f_2=30$ KHz=120 KHz, $N_2=512$.

It should be further understood that if $f_1=f_2$, in other words, if subcarrier spacings of two synchronization signals are equal, $N_1$ may be equal to $N_2$; or if $f_1 \neq f_2$, $N_1$ may not be equal to $N_2$.

Further, the sending preprocessing may further include: adding a cyclic prefix after the inverse discrete Fourier transform is performed.

For a specific operation of adding the cyclic prefix, refer to the prior art. For brevity, details are not described herein.

(2)

The sending preprocessing may include subcarrier mapping and inverse discrete Fourier transform. For details, refer to the description in (1). For brevity, details are not described herein again.

(3)

Specifically, corresponding to Manner 1 and Manner 3 that are in the case 3, the sending preprocessing may be implemented by using Solution 1. Corresponding to Manner 2 in the case 2, the sending preprocessing may be implemented by using Solution 2.

Solution 1

The sending preprocessing may include cyclic prefix addition.

Specifically, cyclic prefixes are added to $Z_1$ and $Z_2$. For an operation of adding the cyclic prefixes, refer to the prior art. For brevity, details are not described herein.

Solution 2

The sending preprocessing may include inverse discrete Fourier transform and cyclic prefix addition.

Specifically, $N_1$-point inverse discrete Fourier transform and $N_2$-point inverse discrete Fourier transform are respectively performed on $Z_1$ and $Z_2$. Then, cyclic prefixes are added to two obtained signals. For an operation of adding the cyclic prefixes, refer to the prior art. For brevity, details are not described herein.

When the inverse discrete Fourier transform is performed, a value of $N_i$ may be determined based on a subcarrier spacing $f_i$ obtained after the subcarrier mapping is performed on $X_i$.

For example, in a given system bandwidth, when $f_1=15$ KHz, $N_1=4096$, and when $f_2=30$ KHz, $N_2=2048$, or when $f_2=30$ KHz=120 KHz, $N_2=512$.

It should be further understood that if $f_1=f_2$, in other words, if subcarrier spacings of two synchronization signals are equal, $N_1$ may be equal to $N_2$; or if $f_1 \neq f_2$, $N_1$ may not be equal to $N_2$.

(4)

The sending preprocessing may be implemented by using Solution 1 or Solution 2 in (3). For brevity, details are not described herein again.

For any one of the foregoing (1) to (4), the sending preprocessing may further include: adding finally obtained signals, for example, adding signals to which cyclic prefixes are added.

Further, the sending preprocessing may further include: performing radio frequency processing on a signal obtained after addition. Then, a signal obtained after the radio frequency processing is sent.

According to the method in this embodiment of this application, phase compensation is performed on a synchronization signal that is not at the center frequency of the current carrier, so that a phase difference caused because the synchronization signal is not at the center frequency of the current carrier can be eliminated as much as possible, and a subcarrier offset caused by the phase difference can be eliminated as much as possible. This can increase a possibility that the terminal device demodulates a system message, and help the terminal device successfully access a system. Further, if the system message is located at the center frequency of the current carrier, the terminal device can correctly demodulate data (for example, the system message). In addition, if the data is the system message, according to the method in this embodiment of this application, phase compensation is performed on the system message that is not at the center frequency of the current carrier, so that the terminal device can correctly demodulate the system message, and the terminal device can successfully access the system.

Optionally, in an embodiment of this application, when the k signals include m synchronization signals, if the k signals further include r pieces of data, any one of the r pieces of data is located at a non-center frequency of the current carrier, each of the m first signals corresponds to at least one of the r pieces of data, all of the m first signals correspond to different pieces of data in the r pieces of data, $r \geq 1$, and r is an integer, the method may further include first or second optional operation(s).

First Optional Operation: Perform a phase compensation operation of a corresponding frequency on each of the r pieces of data, or a signal generated by performing the first operation on each of the r pieces of data.

Specifically, corresponding processing may be performed on each of the r pieces of data with reference to the foregoing processing on each of the m pieces of data. For brevity, details are not described herein again.

It should be understood that the network device may perform phase compensation based on $\Delta f_i$. If the network device does not perform phase compensation based on $\Delta f_i$, the terminal device performs phase compensation based on $-\Delta f_i$.

Second Optional Operation: Send a physical broadcast channel.

Specifically, the physical broadcast channel includes first indication information. The first indication information is used to indicate a difference between a center frequency of each of at least one piece of data corresponding to each of the m first signals and a center frequency of the first signal.

In this way, after obtaining a synchronization signal, for example, a first synchronization signal, the terminal device may demodulate, when receiving data, the data based on a difference (denoted as a first difference) between a center frequency of the first synchronization signal and a center frequency of a first piece of data (namely, an example of first data).

It should be understood that the first piece of data corresponds to the first synchronization signal, and the first piece of data may be a system message. However, this is not limited in this embodiment of this application.

Optionally, the m synchronization signals and the r pieces of data are located in a same bandwidth part.

Optionally, before the terminal device demodulates the first data based on the first difference, the method further includes:

performing a phase compensation operation on data based on the first difference. For details, refer to the embodiment method in which the network device performs the phase compensation operation. For brevity, details are not described herein again.

It should be understood that the terminal device may first perform inverse discrete Fourier transform on the received first data, and then perform the phase compensation operation on a signal obtained after the inverse discrete Fourier transform. Alternatively, the terminal device may first perform the phase compensation operation on the first data, and then perform inverse discrete Fourier transform on a signal obtained after the phase compensation operation. This is not limited in this embodiment of this application.

Optionally, the first data is the system message, the system message includes second indication information, and the second indication information is used to indicate a second difference between the center frequency of the synchronization signal or a center frequency of the system message and a center frequency of second data.

The method further includes:

detecting the second data based on the second difference.

It should be understood that the second data may be data sent by the network device after the terminal device accesses the system.

Optionally, the difference between the center frequency of each of the at least one piece of data corresponding to each of the m first signals and the center frequency of the first signal is a specific value (or a fixed value).

Optionally, the specific value is an element in a predefined first set, and the first set includes a plurality of candidate specific values.

Optionally, when the data is the system message, a center frequency of the system message is the same as a center frequency of a control channel indicating the system message.

Optionally, the control channel may be a physical downlink shared channel (Physical Downlink Shared Channel, PDCSH).

The following describes several possible embodiments of this application with reference to the embodiments shown in FIG. 4 to FIG. 7.

Figure 4:
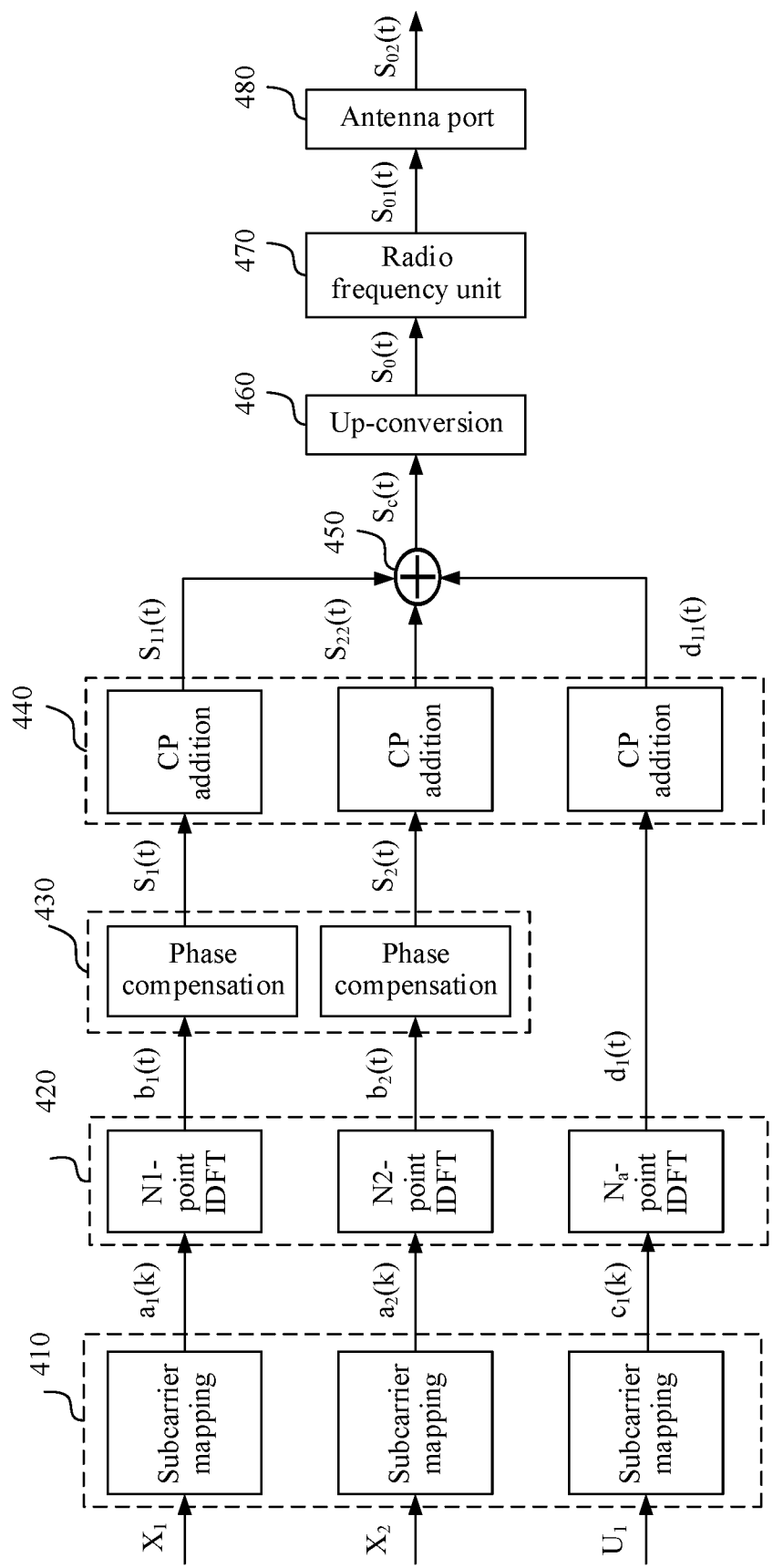
FIG. 4 is a schematic diagram of a transmission method according to a specific embodiment of this application.

FIG. 4 is an example diagram according to an embodiment of this application.

410. Separately perform subcarrier mapping on two synchronization signals $X_1$ and $X_2$ to obtain $a_1(k)$ and $a_2(k)$, and perform subcarrier mapping on a data signal $U_1$ to obtain $c_1(k)$.

For $X_1$ and $X_2$, refer to the foregoing descriptions. $U_1$ is located at a center frequency of a current carrier.

420. Perform $N_i$-point inverse discrete Fourier transform on $a_i(k)$ to obtain a corresponding signal $b_i(t)$, and perform $N_a$-point inverse discrete Fourier transform on $c_1(k)(k)$ to obtain a signal $d_1(t)$.

$b_i(t)$ is represented as follows:

$$b_i(t) = \frac{1}{\sqrt{N_i}} \sum_{k=0}^{N_i-1} a_i(k) e^{j2\pi k \cdot f_i t} \qquad (9)$$

$f_i$ indicates a subcarrier spacing of $a_i(k)$.

Similarly, an expression of a signal on which no normalization operation is performed is:

$$b_i(t) = \sum_{k=0}^{N_i-1} a_i(k) e^{j2\pi k \cdot f_i t} \qquad (10)$$

$d_1(t)$ is represented as follows:

$$d_i(t) = \frac{1}{\sqrt{N_i}} \sum_{k=0}^{N_a-1} c_1(k) e^{j2\pi k \cdot f_f t} \qquad (11)$$

$f_f$ indicates a subcarrier spacing of $c_1(k)$.

430. Perform a phase compensation operation of a corresponding frequency value on each of $b_1(t)$ and $b_2(t)$, to obtain corresponding signals $S_1(t)$ and $S_2(t)$. $S_i(t)$ is represented as follows:

$$S_i(t) = b_i(t) e^{j2\pi k \cdot \Delta f_i t} = \left( \frac{1}{\sqrt{N_i}} \sum_{k=0}^{N_i-1} a_i(k) e^{j2\pi k \cdot f_i t} \right) e^{j2\pi k \cdot \Delta f_i t} \qquad (12)$$

$\Delta f_i$ is a frequency value corresponding to $b_i(t)$.

440. Add a cyclic prefix to each of $S_1(t)$, $S_2(t)$, and $d_1(t)$, to obtain signals $S_{11}(t)$, $S_{22}(t)$, and $d_{11}(t)$.

450. Add $S_{11}(t)$, $S_{22}(t)$, and $d_{11}(t)$, to obtain a signal $S_c(t)$.

460. Up-convert $S_c(t)$ to a center frequency $f_c$ in a radio frequency for a baseband signal of $S_c(t)$, to obtain $S_0(t)$.

470. Input $S_0(t)$ into a radio frequency RF unit, and perform radio frequency processing on $S_0(t)$, to obtain a signal $S_{01}(t)$.

480. Map the signal $S_{01}(t)$ to an antenna port, to obtain $S_{02}(t)$.

Finally, $S_{02}(t)$ is sent.

Figure 5:
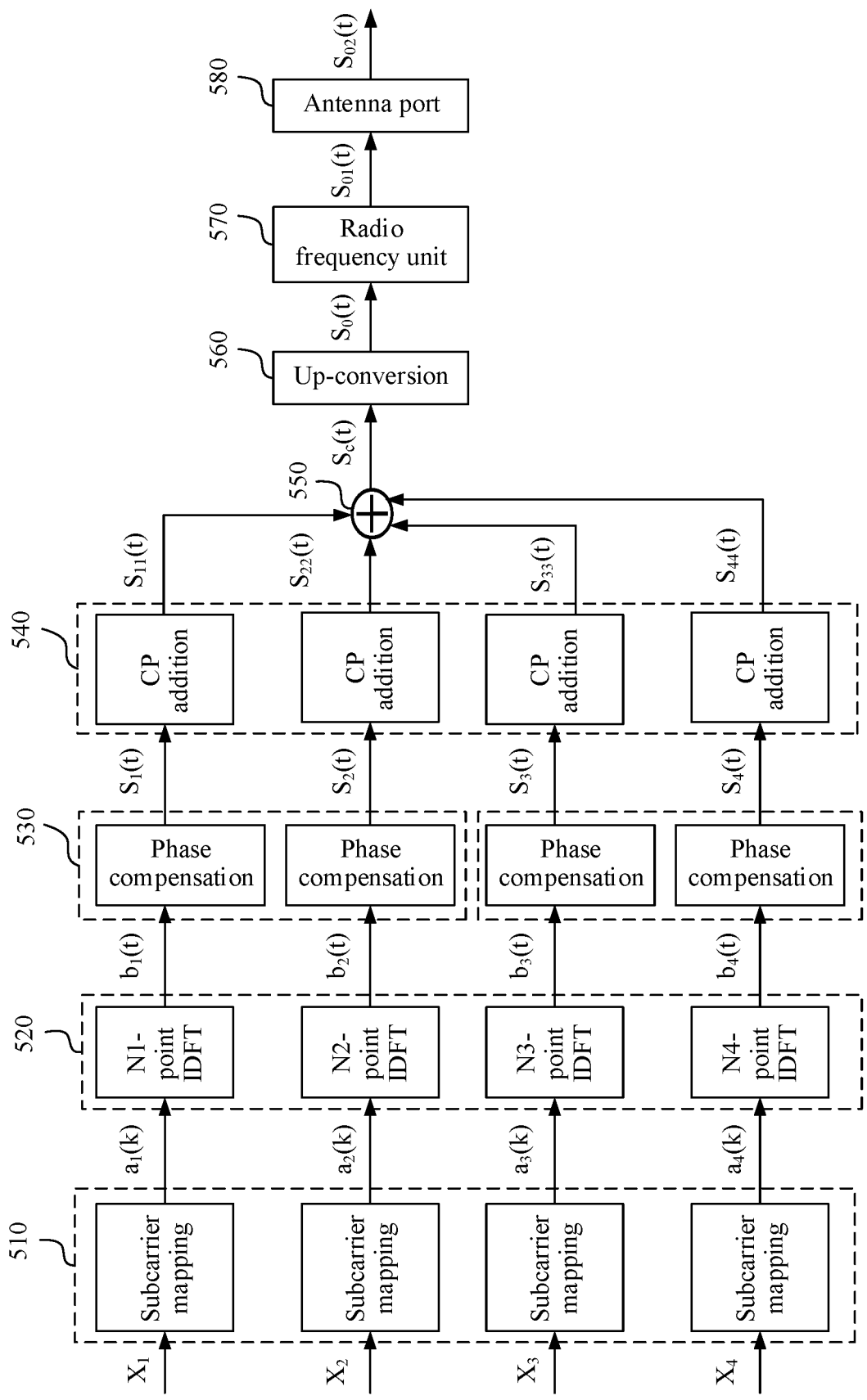
FIG. 5 is a schematic diagram of a transmission method according to a specific embodiment of this application.

FIG. 5 is an example diagram according to another embodiment of this application.

510. Separately perform subcarrier mapping on two synchronization signals $X_1$ and $X_2$ and two pieces of data $X_3$ and $X_4$, to obtain $a_i(k)$.

$X_1$ to $X_4$ each are located at a non-center frequency of a current carrier.

520. Perform $N_i$-point inverse discrete Fourier transform on $a_i(k)$, to obtain a corresponding signal $b_i(t)$. $b_i(t)$ is represented as follows:

$$b_i(t) = \frac{1}{\sqrt{N_i}} \sum_{k=0}^{N_i-1} a_i(k) e^{j2\pi k \cdot f_i t} \qquad (13)$$

$f_i$ indicates a subcarrier spacing of $a_i(k)$.

530. Perform a phase compensation operation of a corresponding frequency value on $b_i(t)$, to obtain a signal $S_i(t)$ that is represented as follows:

$$S_i(t) = b_i(t) e^{j2\pi k \cdot \Delta f_i t} = \left( \frac{1}{\sqrt{N_i}} \sum_{k=0}^{N_i-1} a_i(k) e^{j2\pi k \cdot f_i t} \right) e^{j2\pi k \cdot \Delta f_i t} \qquad (14)$$

$\Delta f_i$ is a frequency value corresponding to $b_i(t)$.

540. Add a cyclic prefix to $S_i(t)$, to obtain a signal $S_{ii}(t)$.

550. Add $S_{11}(t)$ to $S_{44}(t)$, to obtain a signal $S_c(t)$.

560. Up-convert $S_c(t)$ to a center frequency $f_c$ in a radio frequency for a baseband signal of $S_c(t)$, to obtain $S_0(t)$.

570. Input $S_0(t)$ into a radio frequency RF unit, and perform radio frequency processing on $S_0(t)$, to obtain a signal $S_{01}(t)$.

580. Map the signal $S_{01}(t)$ to an antenna port, to obtain $S_{02}(t)$.

Finally, $S_{02}(t)$ is sent.

Figure 6:
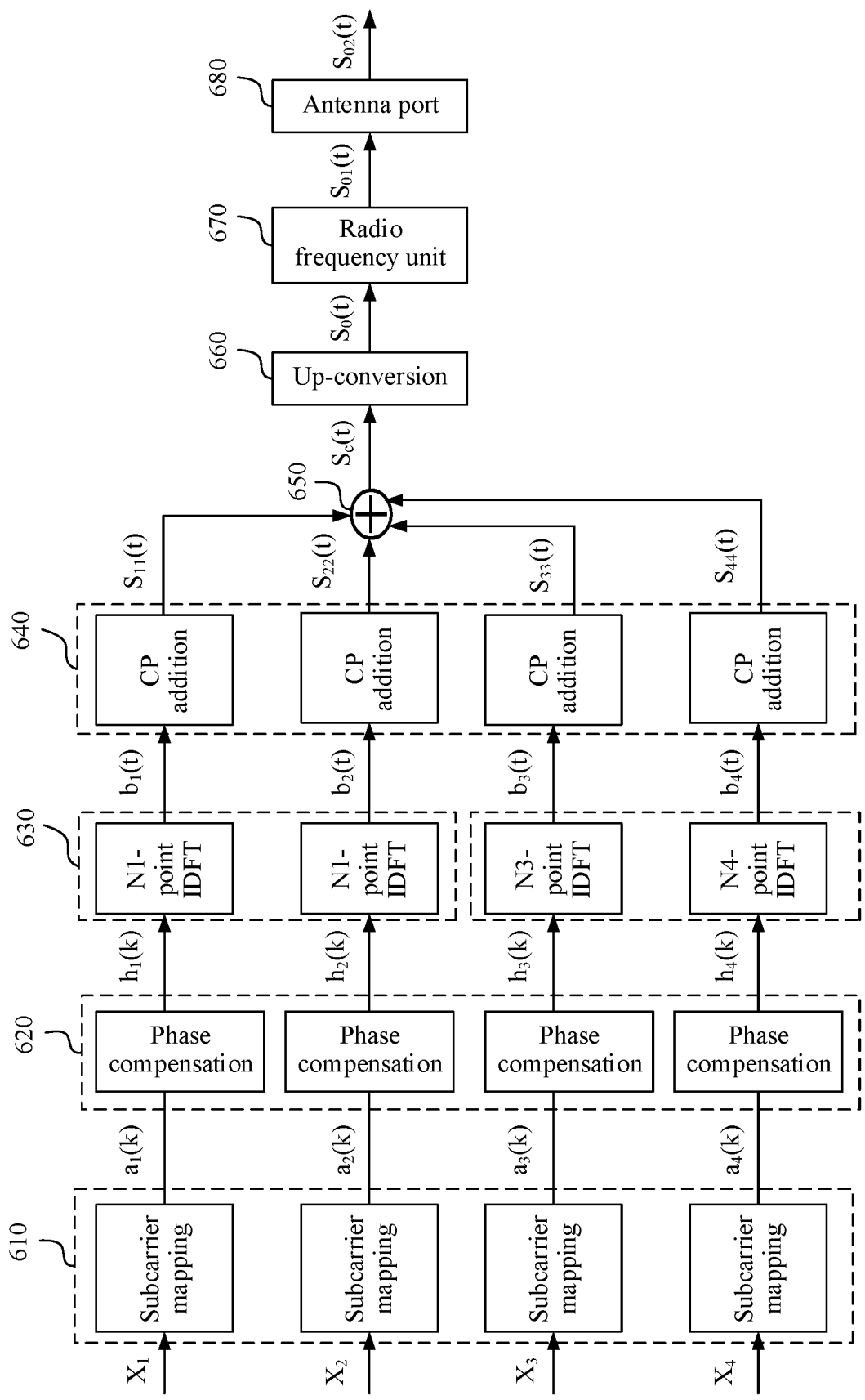
FIG. 6 is a schematic diagram of a transmission method according to a specific embodiment of this application.

FIG. 6 is an example diagram according to still another embodiment of this application.

610. Separately perform subcarrier mapping on two synchronization signals $X_1$ and $X_2$ and two pieces of data $X_3$ and $X_4$, to obtain $a_i(k)$.

$X_1$ to $X_4$ each are located at a non-center frequency of a current carrier.

620. Perform a phase compensation operation of a corresponding frequency on $a_i(k)$, to obtain a signal $h_i(k)$. $h_i(k)$ is represented as follows:

$$h_i(k) = a_i e^{j2\pi k \cdot \Delta f_i t} \qquad (15)$$

630. Perform Ni-point inverse discrete Fourier transform on $h_i(k)$, to obtain a corresponding signal $b_i(t)$. $b_i(t)$ is represented as follows:

$$b_i(t) = \frac{1}{\sqrt{N_i}} \sum_{k=0}^{N_i-1} h_i(k)e^{j2\pi k \cdot f_i t} = \frac{1}{\sqrt{N_i}} \sum_{k=0}^{N_i-1} a_i(k)e^{j2\pi k \cdot (\Delta f_i + f_i)t} \quad (16)$$

$f_i$ indicates a subcarrier spacing of $a_i(k)$.

640. Add a cyclic prefix to $b_i(t)$, to obtain a signal $S_{ii}(t)$.

650. Add $S_{11}(t)$ to $S_{44}(t)$, to obtain a signal $S_c(t)$. $S_c(t)$ is represented as follows:

660. Up-convert $S_c(t)$ to a center frequency $f_c$ in a radio frequency for a baseband signal of $S_c(t)$, to obtain $S_0(t)$.

670. Input $S_0(t)$ into a radio frequency RF unit, and perform radio frequency processing on $S_0(t)$, to obtain a signal $S_{01}(t)$.

680. Map the signal $S_{01}(t)$ to an antenna port, to obtain $S_{02}(t)$.

Finally, $S_{02}(t)$ is sent.

Figure 7:
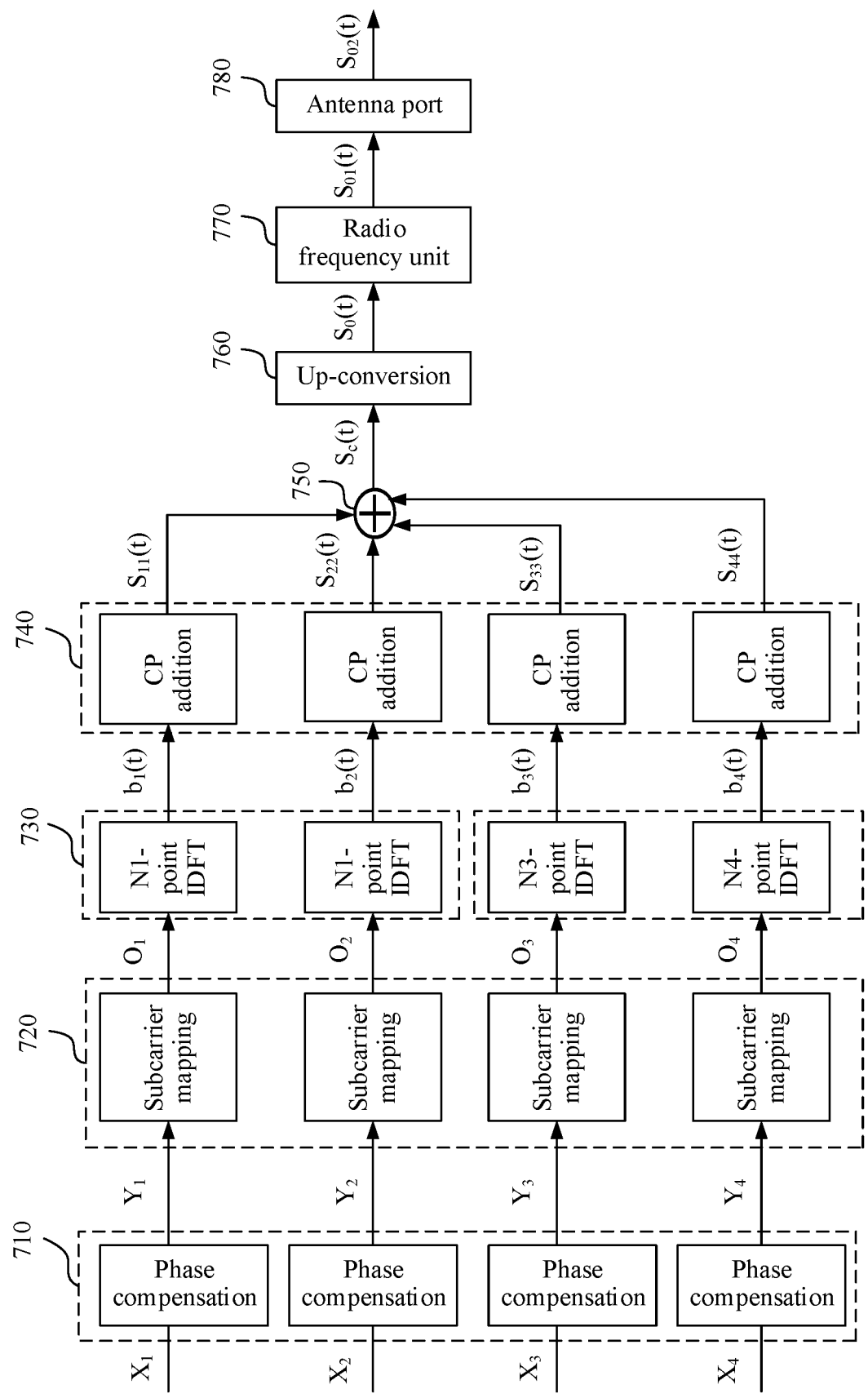
FIG. 7 is a schematic diagram of a transmission method according to a specific embodiment of this application.

FIG. 7 is an example diagram according to still another embodiment of this application.

710. Perform a phase compensation operation of a corresponding frequency on each of two synchronization signals $X_1$ and $X_2$ and two pieces of data $X_3$ and $X_4$, to obtain a signal $Y_i$. An expression of $Y_i$ is as follows:

$$Y_i = X_i e^{j2\pi k \cdot \Delta f_i t}, i=1,2 \quad (17)$$

$X_1$ to $X_4$ each are located at a non-center frequency of a current carrier.

720. Perform subcarrier mapping on $Y_i$, to obtain a signal $O_i$.

730. Perform $N_i$-point inverse discrete Fourier transform on $O_i$, to obtain a corresponding signal $b_i(t)$. $b_i(t)$ is represented as follows:

$$b_i(t) = \frac{1}{\sqrt{N_i}} \sum_{k=0}^{N_i-1} O_i(k)e^{j2\pi k \cdot f_i t} \quad (18)$$

740. Add a cyclic prefix to $b_i(t)$, to obtain a signal $S_{ii}(t)$.

750. Add $S_{11}(t)$ to $S_{44}(t)$, to obtain a signal $S_c(t)$. $S_c(t)$ is represented as follows:

760. Up-convert $S_c(t)$ to a center frequency $f_c$ in a radio frequency for a baseband signal of $S_c(t)$, to obtain $S_0(t)$.

770. Input $S_0(t)$ into a radio frequency RF unit, and perform radio frequency processing on $S_0(t)$, to obtain a signal $S_{01}(t)$.

780. Send the signal $S_{01}(t)$ through an antenna port.

According to the methods shown in FIG. 4 to FIG. 7, after receiving $S_{02}(t)$, a terminal device can demodulate a system message and other data based on $S_{02}(t)$.

In conclusion, according to the transmission method in the embodiments of this application, a transmit end may not perform phase compensation on a synchronization signal, but perform phase compensation on only data. In this case, the transmit end may notify a terminal of a difference between a center frequency of the synchronization signal and a center frequency of a current carrier or a difference between a center frequency of the synchronization signal and a center frequency of a data channel in a current carrier, and a receive end performs phase compensation based on the difference, so that the receive end can correctly adjust the data. Alternatively, a transmit end may perform phase compensation on both a synchronization signal and data. In this case, a receive end can correctly demodulate the data without performing phase compensation. Alternatively, a transmit end may perform phase compensation on a synchronization signal, but perform no phase compensation on data. In this case, a receive end may notify the receive end of a difference between a center frequency of the data and a center frequency of a current carrier, or a difference between a center frequency of the data and a center frequency of a data channel in a current carrier, and the receive end performs phase compensation on the data based on the difference, so that the receive end can correctly adjust the data.

The foregoing describes the transmission method according to the embodiments of this application with reference to FIG. 3 to FIG. 7. The following specifically describes a transmission apparatus according to the embodiments of this application.

Figure 8:
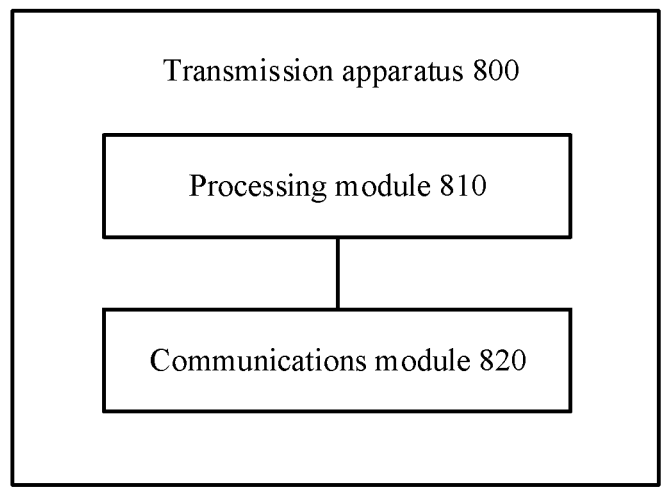
FIG. 8 is a schematic block diagram of a transmission apparatus according to an embodiment of this application.

FIG. 8 is a schematic block diagram of a transmission apparatus 800 according to an embodiment of this application. As shown in FIG. 8, the transmission apparatus 800 includes a processing module 810 and a communications module 820.

The processing module 810 is configured to perform a phase compensation operation of a corresponding frequency value on each of m first signals in k signals, to obtain m second signals. Each of the m first signals is located at a non-center frequency of a current carrier, each first signal is a synchronization signal or data, m and k each are a positive integer, and m≤k.

The communications module 820 is configured to perform sending processing on the m second signals.

Alternatively, the processing module 810 is configured to: perform inverse discrete Fourier transform on each of m first signals in k signals, to obtain m second signals, and perform a phase compensation operation of a corresponding frequency value on each of the m second signals, to obtain m third signals. Each of the m first signals is located at a non-center frequency of a current carrier, each first signal is a synchronization signal or data, m and k each are a positive integer, and m≤k.

The communications module 820 performs sending processing on the m third signals.

It should be understood that the modules in the transmission apparatus 800 are separately configured to perform actions or processing processes performed by the transmit end (for example, the network device) in the foregoing methods, and therefore, can also implement the beneficial effects in the foregoing method embodiments. Herein, to avoid redundancy, detailed descriptions thereof are omitted.

Figure 9:
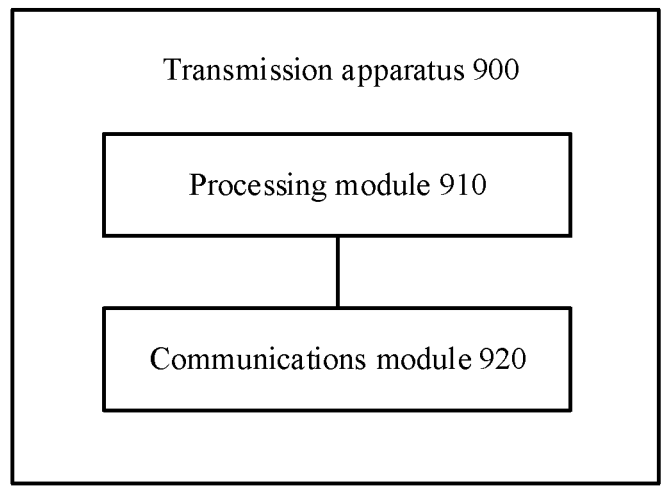
FIG. 9 is a schematic block diagram of another transmission apparatus according to an embodiment of this application.

FIG. 9 is a schematic block diagram of a transmission apparatus 900 according to an embodiment of this application. As shown in FIG. 9, the transmission apparatus 900 includes a processing module 910 and a communications module 920.

The processing module 910 is configured to obtain a synchronization signal and a physical broadcast channel. The physical broadcast channel includes first indication information, and the first indication information indicates a first difference between a center frequency of the synchronization signal and a center frequency of first data.

The communications module 920 is configured to receive the first data.

The processing module 910 is further configured to demodulate the first data based on the first difference.

It should be understood that the modules in the transmission apparatus 900 are separately configured to perform actions or processing processes performed by the receive end (for example, the terminal device) in the foregoing methods, and therefore, can also implement the beneficial effects in the foregoing method embodiments. Herein, to avoid redundancy, detailed descriptions thereof are omitted.

Figure 10:
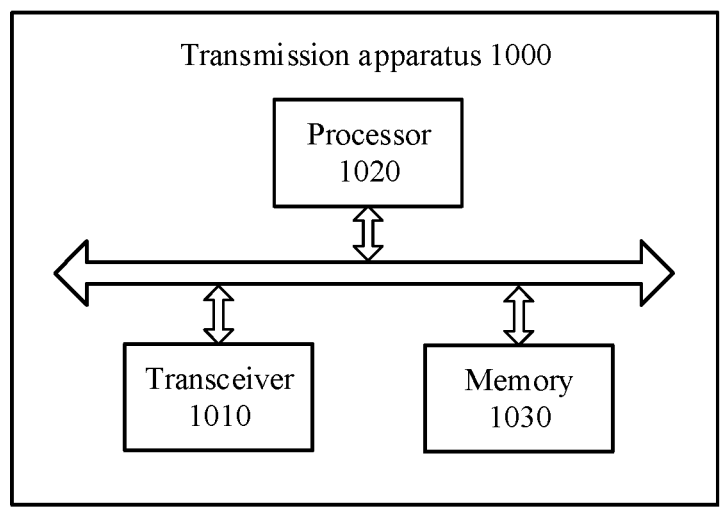
FIG. 10 is a schematic block diagram of a transmission apparatus according to an embodiment of this application.

FIG. 10 is a schematic structural diagram of a transmission apparatus 1000 according to an embodiment of this application. As shown in FIG. 10, the terminal device 1000 includes a transceiver 1010, a processor 1020, and a memory 1030. The transceiver 1010, the processor 1020, and the memory 1030 communicate with each other through an internal connection path, to transmit a control signal and/or a data signal.

The processor 1020 is configured to perform a phase compensation operation of a corresponding frequency value on each of m first signals in k signals, to obtain m second signals. Each of the m first signals is located at a non-center frequency of a current carrier, each first signal is a synchronization signal or data, m and k each are a positive integer, and m≤k.

The transceiver 1010 is configured to perform sending processing on the m second signals.

Alternatively, the processor 1020 is configured to: perform inverse discrete Fourier transform on each of m first signals in k signals, to obtain m second signals, and perform a phase compensation operation of a corresponding frequency value on each of the m second signals, to obtain m third signals. Each of the m first signals is located at a non-center frequency of a current carrier, each first signal is a synchronization signal or data, m and k each are a positive integer, and m≤k.

The transceiver 1010 performs sending processing on the m third signals.

It should be noted that the transceiver 1010 may include some or all processing functions of the processor 1020.

It should be understood that, when the processor 1020 invokes the computer program from the memory and runs the computer program, the processor 1020 may be configured to: perform a data processing function and/or a signal processing function of the transmit end in the foregoing methods, and control the transceiver 1010 to complete a corresponding information receiving and sending function of the transmit end.

Figure 11:
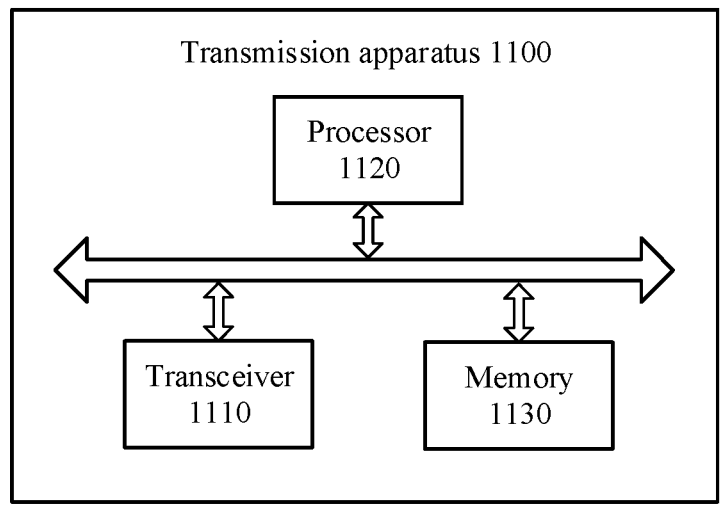
FIG. 11 is a schematic block diagram of another transmission apparatus according to an embodiment of this application.

FIG. 11 is a schematic structural diagram of a transmission apparatus 1100 according to an embodiment of this application. As shown in FIG. 11, the terminal device 1100 includes a transceiver 1110, a processor 1120, and a memory 1130. The transceiver 1110, the processor 1120, and the memory 1130 communicate with each other through an internal connection path, to transmit a control signal and/or a data signal.

The processor 1120 is configured to obtain a synchronization signal and a physical broadcast channel. The physical broadcast channel includes first indication information, and the first indication information indicates a first difference between a center frequency of the synchronization signal and a center frequency of first data.

The transceiver 1110 is configured to receive the first data.

The processor 1120 is further configured to demodulate the first data based on the first difference.

It should be understood that, when the processor 1120 invokes the computer program from the memory and runs the computer program, the processor 1020 may be configured to: perform a data processing function and/or a signal processing function of the receive end in the foregoing methods, and control the transceiver 1110 to complete a corresponding information receiving and sending function of the receive end.

The embodiments of this application may be applied to a processor, or implemented by a processor. The processor may be an integrated circuit chip and has a signal processing capability. In an implementation process, steps in the foregoing method embodiments can be implemented by using a hardware integrated logic circuit in the processor, or by using instructions in a form of software. The foregoing processor may be a central processing unit (CPU), or the processor may be another general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, steps, and logical block diagrams that are disclosed in the embodiments of this application. The general-purpose processor may be a microprocessor, or the processor may be any conventional processor or the like. Steps of the methods disclosed with reference to the embodiments of this application may be directly performed and accomplished by using a hardware decoding processor, or may be performed and accomplished by using a combination of hardware and a software unit in the decoding processor. The software unit may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the steps in the foregoing methods in combination with hardware of the processor.

It may be understood that when the embodiments of this application are applied to a transmit end chip, the transmit end chip implements a function of the processing module 810 or the processor 1020. The transmit end chip sends the foregoing second signal or third signal from another module (for example, a radio frequency module or an antenna) of a transmit end. The second signal or the third signal is sent by a receive end to the transmit end. Optionally, the transmit end chip may further send information to another module (for example, a radio frequency module or an antenna) of the transmit end, and the information is sent to the receive end by using the another module of the transmit end.

When the embodiments of this application are applied to a receive end chip, the receive end chip implements a function of the processing module 910 or the processor 1120. The receive end chip receives the foregoing synchronization data and data from another module (for example, a radio frequency module or an antenna) of a receive end. The synchronization data and the data are sent to the receive end by using the another module of the receive end. Optionally, the receive end chip may further receive information from another module (for example, a radio frequency module or an antenna) of the receive end, and the information is sent by a transmit end to the receive end.

It may be understood that the memory in the embodiments of this application may be a volatile memory or a nonvolatile memory, or may include a volatile memory and a nonvolatile memory. The nonvolatile memory may be a read-only memory ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), and is used as an external cache. By way of example and not limitation, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DRRAM). It should be noted that the memory in the systems and methods described in this specification includes but is not limited to these memories and memories of any other proper types.

It should be understood that, the term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing apparatus and unit, refer to a corresponding process in the foregoing method embodiments. Details are not described herein again.

In the several embodiments provided in this application, it should be understood that the disclosed apparatus and method may be implemented in other manners. For example, the described apparatus embodiments are merely examples. For example, division into the units is merely logical function division. There may be another division manner in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in the form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments and implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A transmission method performed by a transmit end device, the method comprising:
    performing a phase compensation operation of a corresponding frequency value on each of m first signals in k signals, to obtain m second signals, wherein each of the m first signals is located at a non-center frequency of a current carrier, each first signal is a synchronization signal or data, m and k each are positive integers, and m≤k, wherein a frequency the transmit end device is centered on is different from a frequency used when a receive end device receives a signal sent by the transmit end; and
    performing sending processing on the m second signals.

2. The method according to claim 1, wherein the performing sending processing on the m second signals comprises:
    sending the m second signals; or
    performing sending preprocessing on the m second signals, and sending preprocessed signals.

3. The method according to claim 1, wherein before the performing the phase compensation operation of the corresponding frequency value on each of m first signals in k signals, the method further comprises:
    performing subcarrier mapping on a first first signal and a second first signal in the m first signals; and
    performing an $N_1$-point inverse discrete Fourier transform on the first first signal obtained from the subcarrier mapping; and
    performing an $N_2$-point inverse discrete Fourier transform on the second first signal obtained from the subcarrier mapping.

4. The method according to claim 1, wherein the synchronization signal is located in a bandwidth part (BWP).

5. The method according to claim 1, wherein at least two of the m first signals have different subcarrier spacings.

6. A transmission apparatus, comprising:
- a processor, configured to perform a phase compensation operation of a corresponding frequency value on each of m first signals in k signals, to obtain m second signals, wherein each of the m first signals is located at a non-center frequency of a current carrier, each first signal is a synchronization signal or data, m and k each are positive integers, and m≤k, wherein a frequency the transmission apparatus is centered on is different from a frequency used when a further transmission apparatus receives a signal sent by the transmission apparatus; and
- a transmitter, configured to perform sending processing on the m second signals.

7. The apparatus according to claim 6, wherein the transmitter configured to perform sending processing on the m second signals comprises the processor further configured to:
- send the m second signals; or
- perform preprocessing on the m second signals, and send preprocessed signals.

8. The apparatus according to claim 6, wherein the processor is further configured to:
- perform subcarrier mapping on a first first signal and a second first signal in the m first signals; and
- perform an $N_1$-point inverse discrete Fourier transform on the first first signal obtained from the subcarrier mapping; and
- perform an $N_2$-point inverse discrete Fourier transform on the second first signal obtained from the subcarrier mapping.

9. The apparatus according to claim 6, wherein the synchronization signal is located in a bandwidth part (BWP).

10. The apparatus according to claim 6, wherein at least two of the m first signals have different subcarrier spacings.

11. A transmission method performed by a receive end device, the method comprising:
- obtaining a synchronization signal and a physical broadcast channel, wherein the physical broadcast channel comprises first indication information, and the first indication information indicates a first difference between a center frequency of the synchronization signal and a center frequency of first data or between the center frequency of the synchronization signal and a center frequency of a current carrier, wherein a frequency a transmission apparatus is centered on is different from a frequency used when the receive end device receives a signal sent by the transmission apparatus;
- receiving the first data; and
- demodulating the first data based on the first difference.

12. The method according to claim 11, wherein before the demodulating the first data based on the first difference, the method further comprises:
- performing a phase compensation operation on the first data based on the first difference.

13. The method according to claim 11, wherein the first data is a system message, and wherein the center frequency of the system message is the same as a center frequency of a control channel indicating the system message.

14. A transmission apparatus, comprising:
- a processor configured to obtain a synchronization signal and a physical broadcast channel, wherein the physical broadcast channel comprises first indication information, and the first indication information indicates a first difference between a center frequency of the synchronization signal and a center frequency of first data or between the center frequency of the synchronization signal and a center frequency of a current carrier, wherein a frequency a further transmission apparatus is centered on is different from a frequency used when the transmission apparatus receives a signal sent by the further transmission apparatus; and
- a receiver, configured to receive the first data, wherein the processor is further configured to demodulate the first data based on the first difference.

15. The apparatus according to claim 14, wherein the processor is further configured to perform a phase compensation operation on the first data based on the first difference.

16. The apparatus according to claim 14, wherein the first data is a system message, and wherein the center frequency of the system message is the same as a center frequency of a control channel indicating the system message.

17. A non-transitory computer readable medium storing program codes for use by a transmission apparatus, wherein the program codes comprise instructions for:
- performing a phase compensation operation of a corresponding frequency value on each of m first signals in k signals, to obtain m second signals, wherein each of the m first signals is located at a non-center frequency of a current carrier, each first signal is a synchronization signal or data, m and k each are positive integers, and m≤k, wherein a frequency the transmission apparatus is centered on is different from a frequency used when a further transmission apparatus receives a signal sent by the transmission apparatus; and
- sending processing on the m second signals.

18. A non-transitory computer readable medium storing program codes for use by a transmission apparatus, wherein the program codes comprise instructions for:
- obtaining a synchronization signal and a physical broadcast channel, wherein the physical broadcast channel comprises first indication information, and the first indication information indicates a first difference between a center frequency of the synchronization signal and a center frequency of first data or between the center frequency of the synchronization signal and a center frequency of a current carrier, wherein a frequency a further transmission apparatus is centered on is different from a frequency used when the transmission apparatus receives a signal sent by the further transmission apparatus;
- receiving the first data; and
- demodulating the first data based on the first difference.

* * * * *